April 22, 1930. H. CHRISTOPHERSEN 1,755,387
SHAFT PROTECTOR AND METHOD OF MANUFACTURING THE SAME
Filed June 26, 1928
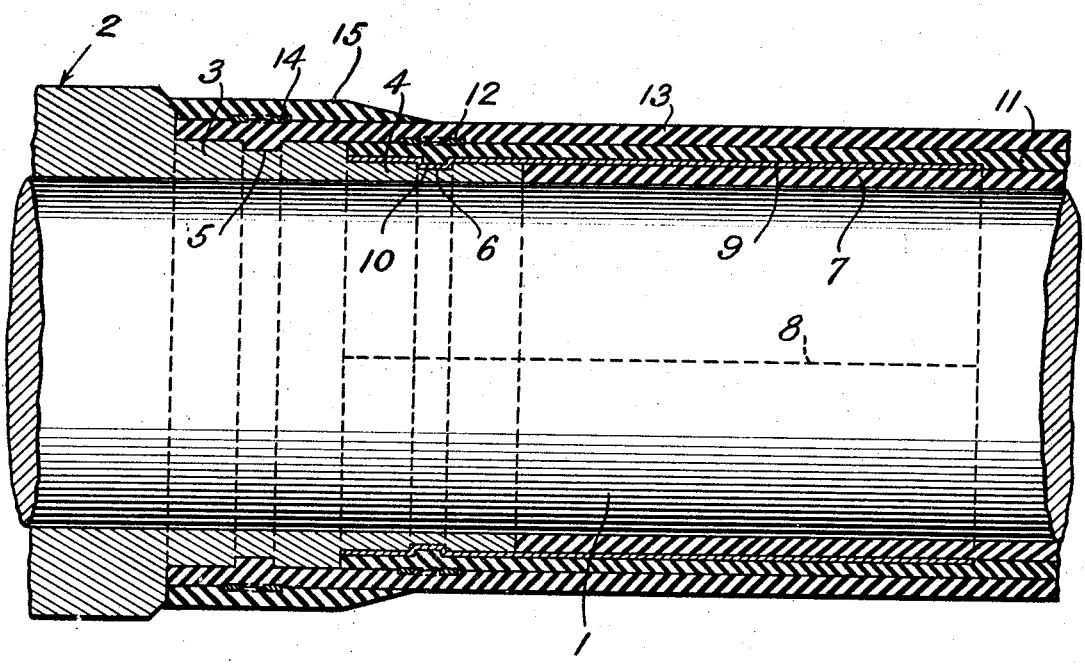
INVENTOR
Herbert Christophersen
BY
Ernest Hopkinson
ATTORNEY Patented Apr. 22, 1930

1,755,387

UNITED STATES PATENT OFFICE

HERBERT CHRISTOPHERSEN, OF EAST ORANGE, NEW JERSEY, ASSIGNOR TO REVERE RUBBER COMPANY, OF CHELSEA, MASSACHUSETTS, A CORPORATION OF RHODE ISLAND

SHAFT PROTECTOR AND METHOD OF MANUFACTURING THE SAME

Application filed June 26, 1928. Serial No. 288,390.

This invention relates to an improved method and means for protecting metallic parts such as propeller shafts of water craft from electrolytic action.

One of the disadvantages in using steel propeller shafts for water craft is that they are subject to pitting and weakening due to the corrosive action of electrolysis, and this is especially rapid where the shaft is indirect contact with a dissimilar metal, such as the bronze bearing member usually shrunk onto the shaft and journaled in a lignum vitæ or other suitable journal in the stern tube of a vessel.

It is one of the objects of this invention to provide means for preventing access of the sea water to the shaft and the bearing member so that electrolytic action cannot occur. For this purpose, the propeller assembly, that is, the shaft and the bearing member, is provided with means including rubber composition for excluding the water from the parts. Heretofore, one of the difficulties encountered in providing a rubber covering has been in securing absolute water tightness at the ends of the covering, which are constantly subjected to vibration due to the whipping of the propeller and to expansion and contraction or other causes tending to loosen the water tight joint at the very point where electrolytic action is the most severe.

For overcoming this defect, the bearing member is provided with a metallic sleeve which is sealed to one end of the bearing member and extends along the shaft, the sleeve being larger in diameter than the shaft and disposed substantially concentric thereto. This disposition of the sleeve provides an annular space between the inner surface thereof and the outer surface of the shaft, and rubber composition is arranged to embed the shaft, bearing member and the outer and inner surfaces of the sleeve, the rubber being securely bonded to both surfaces of the sleeve, also to the other parts of the assembly. If for any reason the sea water obtains access beneath the end of the rubber covering, it cannot reach the shaft because it will have to travel all the way along the sleeve in both directions, that is, along the whole length of the outer surface of the sleeve and then return on the inner surface thereof, and as these surfaces are bonded to the rubber, the water is prevented from reaching the shaft.

Another advantage of the protective sleeve is that it enables repairs to be easily made to the rubber covering as will be evident to those skilled in the art.

Other objects and advantages will appear as the description proceeds.

In the accompanying drawing, which is a fragmental section of a propeller shaft assembly embodying the invention, the reference numeral 1 indicates a propeller shaft usually of steel and having a bearing member 2 of bronze or other suitable composition shrunk onto the sleeve and adapted to revolve in the stern tube journal of a vessel (not shown). Due to the fact that the shaft 1 and the bearing member 2 are in contact with the sea water, electrolytic or galvanic action occurs and there is consequent weakening of the shaft resulting from pitting. Therefore, it becomes necessary to prevent access of the water to the shaft. In accomplishing this result, the bearing member 2 may be provided with a plurality of reduced portions, such as 3 and 4 disposed in stepped relation along the shaft, the reduced portion 3 having a circumferential groove 5 and the reduced portion 4 having a similar groove 6. That portion of the shaft 1 extending beyond the reduced portion 4 is preferably coated with a suitable rubber cement, for instance, one containing zinc oxide, dibenzylamine, and sulphur, whereby it may be vulcanized by subjecting it to the action of carbon disulphide. In this connection see Cadwell Patent No. 1,463,794, August 7, 1923.

A layer of sheet rubber composition 7 of the thickness of the reduced portion 4 is applied around the shaft 1 and joined at its longitudinal edges in any desired manner whereby a water tight seal is obtained. One way is to unite the edges by a scarf-joint. Next a sheet of relatively thin gauge metal, which may be of brass or copper, the latter preferred because rubber bonds tenaciously therewith, is placed around the rubber layer 7, and the longitudinal edges of the metal sheet joined by brazing or otherwise at 8 to form a sleeve 9, one end of which overlaps the reduced portion 4 and is preferably sealed thereto such as by soldering or brazing, or it may be crimped around said reduced portion as indicated at 10. The sleeve 9 is preferably coated with cement on its exposed inner and outer surfaces. A sheet of rubber composition 11 is next placed over the sleeve 9 with its end abutting the adjacent end of the reduced portion 3, and the longitudinal edges of the rubber layer 11 may be joined in the same manner as the layer 7.

In order to reinforce the connection of the layer 11 around the reduced portion 4, a metallic clamping band 12 is arranged to encircle the rubber layer 11 around the annular groove 10. This band 12 is preferably but not necessarily perforated throughout its length so that the rubber flows through the perforations during clamping or subsequent vulcanizing and thereby effects a better holding, as will be readily understood.

A third layer designated 13 is then applied over the layer 11 and extends over the reduced end 3 of the bearing member 2. A perforated metallic band, similar to the band 12 is clamped around the layer 13, and a narrow layer or covering 15 is arranged to encircle the sleeve 13 so as to protect the clamping band 14. Each of the rubber layers is preferably coated with cement before it is applied around the shaft, and the assembly may then be subjected to the action of carbon bisulphide, or any other suitable vulcanizing process may be employed depending upon the composition of the cement and the rubber used, whereby the whole assembly of metallic and rubber parts form a unit, all of the parts being securely bonded together due to the adhesion of the rubber to the metallic parts in cooperation with the clamping bands around the reduced portions 3 and 4 of the bearing member 2. It will thus be seen that the sea water cannot contact with the steel shaft 1 because it is protected by the vulcanized rubber covering, and that, if for any reason the end of the rubber covering should become loosened so as to permit leakage of water between the same and the bearing member 2, the water could not reach the shaft until it had travelled all the way along the metal sleeve 9 and then back again along its inner surface to the end of the reduced member 4, and this could only occur if the bond between the rubber and the metallic sleeve 9 had been destroyed throughout the whole length of the sleeve 9, on both sides thereof. And the vulcanized rubber adheres better to such a sleeve of copper or brass and the like than to steel.

It is to be understood that the present invention is not confined to propeller shafts of vessels but may have embodiment in any connection where it is desired to protect metallic parts so as to prevent corrosion thereof.

While the term "metal" has been used to describe the sleeve 9, it is obvious that other materials may be found to possess at least some of the advantages of metal, and hence it is not intended to impose restrictions upon the material of the sleeve. In some cases the free end of the sleeve 9 may be extended further along the shaft and joined to another member similar to the bearing member 2, whereby both ends of the sleeve are sealed. Furthermore, the sleeve may be of a shape other than straight, for instance, corrugated, dented, or roughened, etc.

Having thus described my invention, what I claim and desire to protect by Letters Patent is:

1. A shaft assembly including, in combination, a shaft, a bearing member thereon, a sleeve sealed to one end of the bearing member and extending beyond said end along the shaft, said sleeve having an inside diameter larger than the shaft and being disposed substantially concentric to the shaft, and vulcanized rubber composition surrounding said sleeve, the shaft, and the ends at least of said bearing member.

2. A shaft assembly including, in combination, a shaft, a bearing member thereon, a sleeve sealed to one end of the bearing member and extending beyond said end along the shaft, said sleeve having an inside diameter larger than the shaft and being disposed substantially concentric to the shaft, vulcanized rubber composition bonded to the inside and the outside surfaces of said sleeve and surrounding the sleeve, the shaft, and said bearing member, and clamping bands embedded in said rubber composition around said bearing member.

3. A propeller shaft assembly including, in combination, a shaft, a bearing member thereon, a sleeve extending around the shaft in spaced relation thereto, and vulcanized rubber composition enclosing the shaft, the bearing member and the sleeve, said composition being bonded to the inside and outside surfaces of the sleeve, the latter having sealed connection at one end thereof to the bearing member.

4. A propeller shaft assembly including, in combination, a shaft, a bearing member mounted on the shaft and having a plurality of reduced portions disposed in stepped relation, a metallic sleeve mounted on and forming a seal with the smallest of said reduced portions and extending beyond the end thereof along the shaft, the inner surface of said sleeve being spaced from the shaft, vulcanized rubber composition surrounding said sleeve, the shaft, and the stepped portions of the bearing member, and metallic clamping bands embedded in said rubber composition around each of said reduced portions.

5. A propeller shaft assembly including, in combination, a shaft, a bearing member thereon, a metallic sleeve disposed around said shaft in spaced relation thereto, said sleeve comprising a sheet of metal joined along its longitudinal edges, said sleeve being mounted on one end of the bearing member and forming a water tight seal therewith and vulcanized rubber composition filling the space between the sleeve and the shaft and covering the outer surfaces of the sleeve, the shaft, and the adjacent portions of the bearing member.

6. A propeller shaft assembly including, in combination, a shaft, a bearing member mounted on the shaft and having a plurality of reduced portions each provided with an annular groove, a metallic sleeve having an end mounted on and sealed to the smallest one of the reduced portions, said sleeve extending beyond the end of said smallest reduced portion and along the shaft, vulcanized rubber composition enclosing the sleeve on both sides and covering said shaft and all of said reduced portions, and clamping bands embedded in the rubber over the grooves surrounding each of said reduced portions.

7. The method of protecting a propeller shaft and a bearing member from corrosion, which comprises applying a layer of vulcanizable rubber composition to the shaft, forming a metallic sleeve around said layer, forming a water tight seal between one end of the sleeve and the bearing member, covering the first layer, the sleeve and the bearing member with rubber composition, and vulcanizing.

8. The method of protecting a shaft and a bearing member exposed to electrolytic action, which comprises applying a layer of vulcanizable rubber composition to the shaft, forming a metallic sleeve containing copper around said layer, providing a water tight seal between one end of the sleeve and the bearing member, applying a second layer of said composition in a manner to cover the sleeve and the first layer, clamping the second layer around said bearing member with a band, applying a third layer of said composition, clamping the third layer with a band, applying a covering layer of said composition over the last named band, and vulcanizing.

9. The method of protecting a shaft and a bearing member exposed to electrolytic action, which comprises applying a coating of cement to the shaft, applying a layer of vulcanizable rubber composition around the shaft over said coating, applying cement to said layer, forming a metallic sleeve containing copper around the first layer, sealing one end of said sleeve to the bearing member, applying cement to the sleeve, applying a second layer of said rubber composition around the sleeve and first layer, clamping the second layer around said bearing member with a band, applying a third layer of rubber composition, clamping said third layer around the bearing member with a band, applying a covering of rubber composition over the third band, and vulcanizing.

10. The method of protecting two dissimilar metallic parts from electrolytic action, which consists in embedding both of the parts in rubber composition having an incorporated metallic sleeve in part at least of copper and forming a water tight seal between one end of said sleeve and one of said parts.

11. The method of protecting two dissimilar metallic parts from electrolytic action, which consists in embedding both of the parts in rubber composition having an incorporated metallic sleeve in part at least of copper, forming a water tight seal between one end of said sleeve and one of said parts, and reinforcing the connection of the rubber composition around the parts with clamping bands.

12. The method of protecting dissimilar metallic parts from corrosion, which consists in embedding the parts in rubber composition having an incorporated sleeve, and forming a water tight seal between at least one end of said sleeve and an adjacent metallic part.

Signed at New York, county and State of New York, this 23rd day of June, 1928.

HERBERT CHRISTOPHERSEN.